United States Patent [19]

Yes

[11] Patent Number: 4,666,601

[45] Date of Patent: May 19, 1987

[54] WATER FILTER

[76] Inventor: Johnson Yes, No. 9, She Tze Street, Shin Lin District, Taipei, Taiwan

[21] Appl. No.: 808,153

[22] Filed: Dec. 12, 1985

[51] Int. Cl.⁴ ............................................. B01D 23/24
[52] U.S. Cl. ....................................... 210/278; 210/793
[58] Field of Search ......... 210/275, 277, 278, 792-796

[56] References Cited

U.S. PATENT DOCUMENTS 2,462,154  2/1949  Barnes ................................. 210/278
3,809,247  5/1974  Brett .................................... 210/278

*Primary Examiner*—Frank Sever

*Attorney, Agent, or Firm*—Birch, Stewart, Kolasch & Birch

[57] ABSTRACT

The present invention relates to an improved water filter which comprises a cone-shaped tank, a filtering bed layer, four conduits provided in the tank and concealed in the filtering bed and a four-way valve provided on the outer wall of the tank at the junction of the conduits which allows passage between any two adjacent conduits by means of a moveable plug operated in a predetermined turn so that the filtering and backwashing process of the tank can be easily controlled by the valve in practical use and the filtering bed is prevented from boiling and cracks along the side walls of the tank.

11 Claims, 5 Drawing Figures

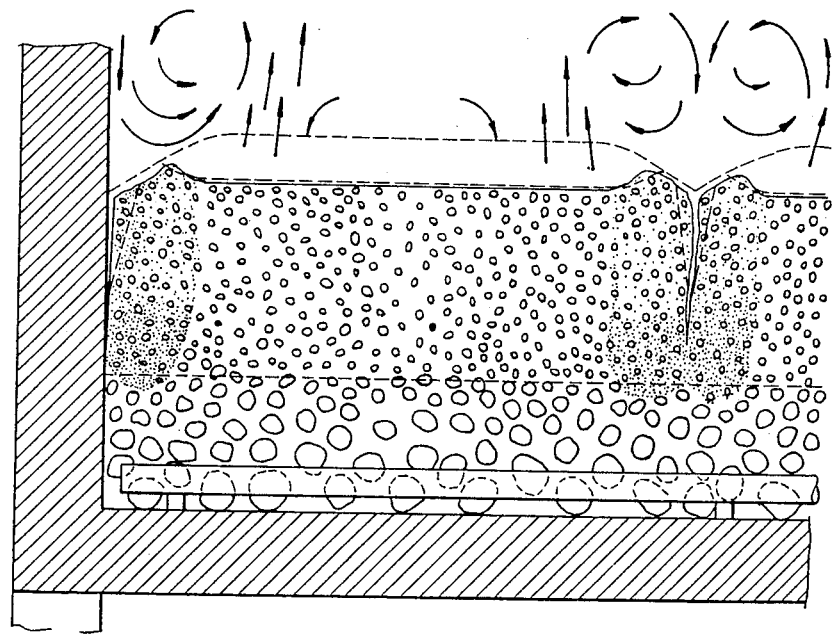
F I G. 2

WATER FILTER

BACKGROUND OF THE INVENTION

The present invention relates to an improved water filter, particularly concerning a cone-shaped water filter tank using an improved valve including a plurality of conduits, concealed in the filter tank.

As seen in FIG. 1, many of the known designs of water filter used today are designed with a tank body 1, a coupling conduit 11, a plurality of controlling valves 12, a plurality of conduit fittings 13, a baffle plate 14, a filtering bed layer 15 and a backwash distributing conduit 16. The coupling conduit 11 is usually arranged in the open air and out of the tank 1. Such a water filter tank has the following disadvantages:

(1) Most of the coupling conduits 11 are made of heavy metal so that they need a conduit fitting 13 at any bend. Besides, the conduit 11 requires a plurality of controlling valves 12 for different controlling purposes resulting in high manufacturing cost. Even though a plastic conduit can be substituted for the metal conduit, there remains the inconvenience that the whole plastic conduit assembly needs to be supported by a supporting member.

(2) The conduit 11, the controlling valves 12 and the conduit fittings 13 are disposed in the open air year round so they are easily damaged by weather or other incidental accidents, such as being bumped by a heavy load, causing water leakage. sometimes, it may be dangerous for people working around the tank if the conduit assembly is leaking HCl during the backwashing operation of the filter tank.

(3) Since the tank 1 is of cylindrical shape with a filtering bed 15 which includes a layer of sand and a layer of gravel etc., there may be some trouble in re-building the filtering bed, if it is disturbed. If the backwash is turned on suddenly, the water may lift the sand bed bodily above the gravel layer, forming an open space between the sand and grave. The filtering bed 15 then breaks at one or more points causing sand boils and subsequent upsetting of the supporting gravel layers. Cracks along the side walls of the tanks may be caused as the filtering bed is pulled away from the side walls of the tank. (see in FIG. 2).

(4) Since the conduit assembly uses a plurality of controlling valves 12, the potential is very great for human error in operation or in turning on and off the water flow.

SUMMARY OF THE INVENTION

With the above disadvantages in mind, the general objects of the invention is to provide an improved water filter which is simple in construction and in which all the conduits are concealed in the tank, supported by the filtering bed itself, so that there is no need to prepare an additional supporting member for the conduits.

The other object of the invention is to provide an improved water filter tank, in which all of its conduits are made of plastics that easily bend at any turning portion of the conduits, so that there is no need to use other conduit fittings and production costs are cut.

A further object of the invention is to provide an improved water filter tank providing a plurality of conduits concealed in the tank safe from damage by the weather and accidents.

A still further object of the invention is to provide an improved water filter tank including an upper venting conduit and lower venting conduit having openings that face the top inner surface and bottom inner surface of the tank respectively so that the filter tank can be designed without a baffle plate.

The main object of the invention is to provide a cone-shaped water filter tank in which the cross sections of the tank taper toward the top portion whereby boiling of the filtering bed and cracks along the side wall of the filter are avoided, eliminating the frequent need to re-build the filtering bed after each backwash process.

In order to achieve the aforesaid objects as well as other incidental objects and advantages, the invention includes a water filtering tank (or ion exchange resin tank) which provides a filtering bed layer, (including layers of sand, gravel, ion exchange resin etc.,), a plurality of conduits concealed in the tank and a four-way valve at the junction of the conduits which allows passage between any two adjacent conduits by means of a moveable plug operated by a dial (or five-way valve) disposed on the outer wall of the tank. The concealed conduits in the tank are supported by the filtering bed and the water ways of the conduits are controlled by the valve during the filtering and backwashing processes of the water filter tank. The tank is in a cone shape in which the upper cross-section of the tank is smaller than the lower cross-section so that the filtering bed can be protected from boiling during the backwash process.

BRIEF DESCRIPTION OF THE DRAWINGS

These and other advantages, objects and features of the present invention will become apparent from the following detailed description of the preferred embodiments with reference to the accompanying drawings, wherein:

FIG. 2 is a partial side-sectional veiw of FIG. 1 showing the boiling of the filtering bed during a backwash process;

FIG. 3b is a side view of FIG. 3a; and

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
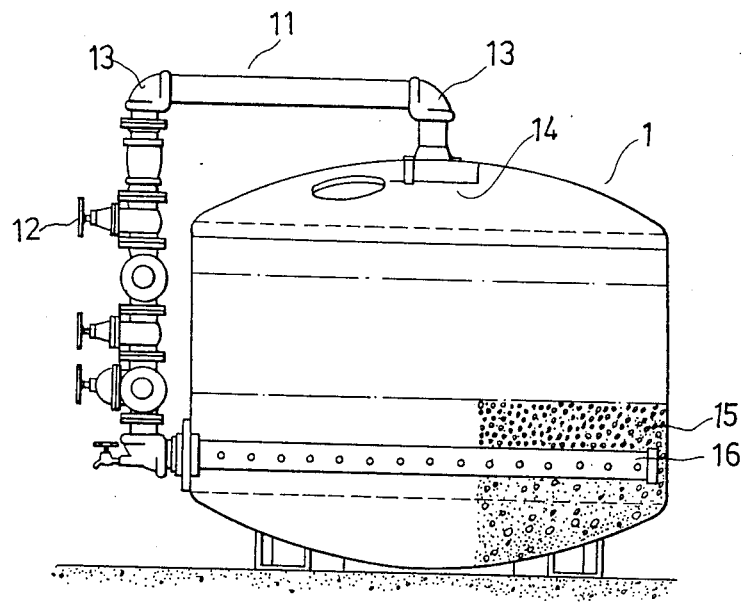
FIG. 1 is a partial exploded view of a water filter tank according to a prior design.
Figure 3A:
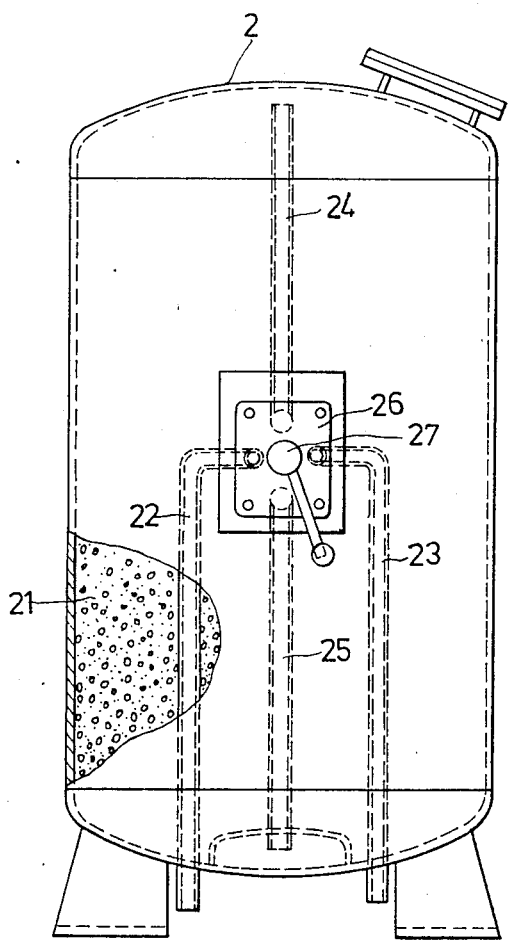
FIG. 3a is a front view of a preferred embodiment of a water filter tank according to the invention.
Figure 3B:
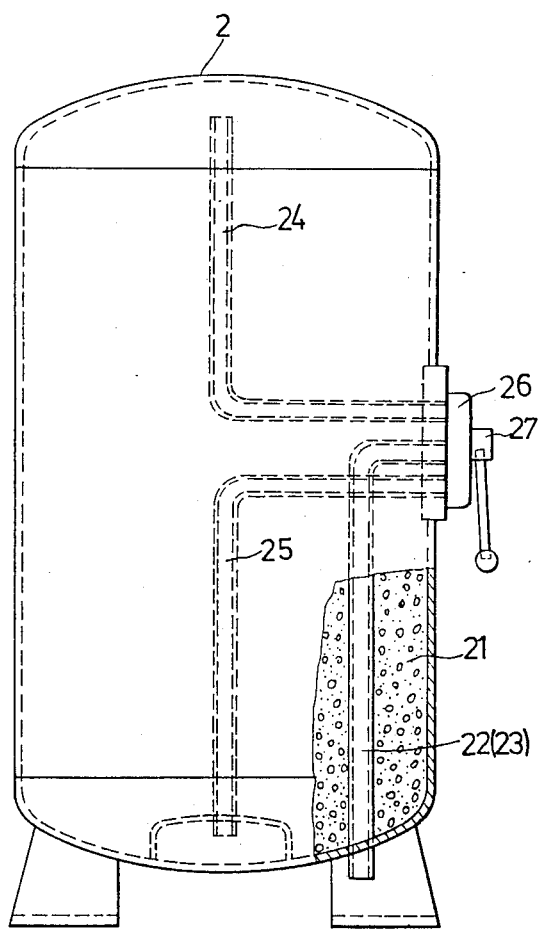

Referring to FIG. 3a and FIG. 3b, the invention includes a tank body 2 provided with filtering bed layer 21, composed of an orderly arrangement of a material such as sand, gravel and ion exchange resin layers etc., within the tank body 2, and an inlet conduit 22 which is adapted to connect to a pump (not shown in the Figs.), an outlet conduit 23, an upper venting conduit 24 and a lower venting conduit 25 concealed in the filtering bed 21 so that all the conduits 22, 23, 24, 25 are supported by the filtering bed 21.

A four-way valve 26 is disposed on the outer wall of the tank body 2 in a suitable position and the conduits 22, 23, 24, 25 are connected to the valve 26. The valve 26 at the junction of four conduits 22, 23, 24, 25 allows passage between any two adjacent conduits by means of a moveable plug 27 operated by turning it to a predetermined position, so the valve 26 can control all the conduits 22, 23, 24, 25 to form different waterways for filtering and backwashing in the water filter tank 2.

During the filtering process, unfiltered raw water enters the inlet conduit 22 through the pump (not shown in the Figs.). The moveable plug 27 of the valve 26 is turned to a position that allows passage between two adjacent conduits 22 to 24 and 23 to 25 so that the raw water flows from the inlet conduit 22 through the passage to the upper venting conduit 24. Since the opening of the upper venting conduit 24 faces the top inner surface of the tank 2, the water sprays out of the conduit against the top inner surface of the filter tank 2 and then down to the filtering bed 21. An advantage of the present invention is that the sand or gravel layer of the filtering bed 21 is prevented from boiling without any baffle plate. The raw water is filtered by the filtering bed 21 and then enters the lower venting conduit 25. Since the valve 26 is arranged such that the moveable plug 27 is in a position to allow the conduit 25 to communicate with the outlet conduit 23 through another passage, the cleaned water flow out from the outlet conduit 23.

After a period of filtering, the filter tank needs to be cleaned by a backwash process. In the backwash process, the moveable plug 27 can be turned to another position to form a passage between two adjacent conduits 22 and 25, 23 and 24. The water enters the inlet conduit 22 and goes into the conduit 25 through the passage. The lower venting conduit 25 now functions as a backwash distributing conduit from which the water comes out and flows upwardly. As the opening of the conduit 25 faces the bottom inner surface of the tank 2, the sand surface rises and a heavy concentration of coagulated material previously filtered from the raw water begins to overflow into the conduit 24, which is now functioning as a washwater trough. Then the washwater passes through the conduit 24 to outlet conduit 23 and flows out of the tank 2. It is essential to slowly admit washwater into the tank 2 so that the velocity of the upward backwash water from the conduit 25 will not churn the filtering bed 21.

Figure 4:
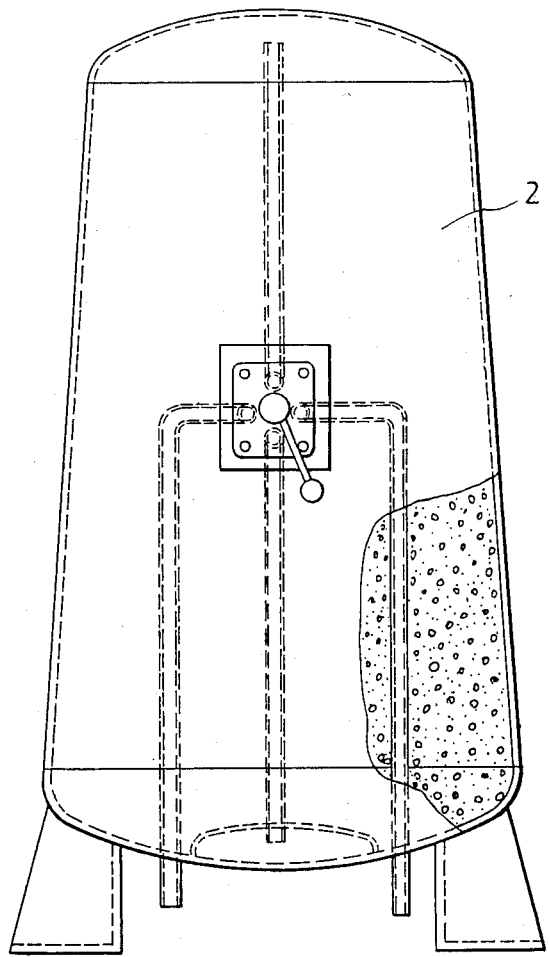
FIG. 4 is a front view of another preferred embodiment of a cone-shaped water filter tank according to the invention.

If the backwash water is turned on suddenly, it lifts bodily the filtering bed 21 above the gravel layer, forming an open space between the sand and gravel. The filtering bed 21 breaks at one or more points, causing itself to boil and subsequently upsetting the supporting filtering bed 21 layers. Often, the filtering bed 21 also pulls away from the sidewalls and forms cracks along the side walls of the tank 2. This results in a requirement for frequent rebuilding of the filtering bed 21. FIG. 4 is another embodiment of the invention in which the tank 2 is designed in a cone shape for solving the above-described problem. The cross section of the cone-shaped tank 2 is tapered from its base to its upper portion at an inclined angle of between 1 to 10 degrees. As the cross section of the tank 2 is tapered at its upper portion, the filtering bed 21 is not easily churned up during the backwash process, and the filtering bed is prevented from pulling away from the sidewalls. The penetrating velocity of the water through the filtering bed 21 can be much quicker than in prior designs so it is convenient in practical use.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

What is claimed is:

1. A water filter comprising:
    a tank having a bottom, a top and a lateral surrounding wall interconnecting said bottom and said top;
    a filter bed composed of paticulate filter medium filling a lower portion of said tank with a remaining upper portion located above said lower portion being left unfilled with a filter medium;
    a plurality of conduits provided in said tank and concealed in said filter bed; and
    a valve disposed on said lateral surrounding wall of said tank and connected to said plurality of conduits, said valve including a movable valve member having passages that can be adjusted to change their positions to communicate desired conduits for different operation modes of the water filter;
    wherein said lateral surrounding wall has a substantially truncated-cone shape, and is tapered only from said lower portion filled with said filter bed towards said upper remaining portion, sufficient for decreasing the width of said upper remaining portion and minimizing boiling of the filter medium during a backwash operation mode of the water filter.

2. The water filter according to claim 1, wherein said lateral surrounding wall has an inclination of about 1-10 degrees with respect to a vertical axis of said tank.

3. A fluid filter comprising:
    a tank having a top portion, bottom portion and side walls connecting said top and bottom portions;
    a filter bed composed of particulate filter medium filling a lower portion of said tank with a remaining upper portion located above said lower portion being left unfilled with filter medium;
    a plurality of conduits extending to different predetermined positions within said tanks; and
    a valve operatively connected to said tank, said valve being connected to said plurality of conduits and connected to a plurality of supply/drain conduits for controlling the flow of fluid into and out of said tank during filtering and backwash modes of operation of the fluid filter;
    wherein said side walls of said tank taper only in the upward vertical direction at a portion of said tank approximately where said bottom portion meets said upper portion of the tank sufficient for preventing boiling of the filter medium during a backwash operation of the filter.

4. The fluid filter according to claim 3, wherein said entire lower portion of said side walls of said tank taper in the upward vertical direction.

5. The fluid filter according to claim 4, wherein said side walls taper at an inclination of about 1-10 degrees with respect to a vertical axis of said tank.

6. The fluid filter according to claim 3, wherein said entire side walls of said tank taper in the upward vertical direction.

7. The fluid filter according to claim 6, wherein said side walls taper at an inclination of about 1-10 degrees with respect to a vertical axis of said tank.

8. The fluid filter according to claim 7 wherein said plurality of conduits being located within said tank, each said plurality of conduits being supported at one end by said valve and supported by said filter medium at portions extending from said valve for removing the requirement for additional support structure within said tank to substantially support said plurality of conduits at their respective operative positions.

9. The fluid filter according to claim 6, wherein said plurality of conduits being located within said tank, each said plurality of conduits being supported at one end by said valve and supported by said filter medium at portions extending from said valve for removing the requirement for additional support structure within said tank to substantially support said plurality of conduits at their respective operative positions.

10. The fluid filter according to claim 3, wherein said side walls taper at an inclination of about 1–10 degrees with respect to a vertical axis of said tank.

11. The fluid filter according to claim 3, wherein said plurality of conduits being located within said tank, each said plurality of conduits being supported at one end by said valve and supported by said filter medium at portions extending from said valve for removing the requirement for additional support structure within said tank to substantially support said plurality of conduits at their respective operative positions.

* * * * *